United States Patent [19]

Nakamura et al.

[11] Patent Number: 5,305,420

[45] Date of Patent: Apr. 19, 1994

[54] METHOD AND APPARATUS FOR HEARING ASSISTANCE WITH SPEECH SPEED CONTROL FUNCTION

[75] Inventors: Akira Nakamura; Ryou Ikezawa; Nobumasa Seiyama; Tohru Takagi; Eiichi Miyasaka, all of Tokyo, Japan

[73] Assignee: Nippon Hoso Kyokai, Japan

[21] Appl. No.: 950,411

[22] Filed: Sep. 22, 1992

[30] Foreign Application Priority Data

Sep. 25, 1991 [JP] Japan .................................. 3-245960
Mar. 10, 1992 [JP] Japan .................................. 4-051787

[51] Int. Cl.$^5$ .............................................. G10L 9/02
[52] U.S. Cl. .................................................... 395/2.8
[58] Field of Search .................................. 381/29-53; 395/2.8; 434/112

[56] References Cited

U.S. PATENT DOCUMENTS

| | | | |
|---|---|---|---|
| 4,423,290 | 12/1983 | Yoshida et al. | 395/2 |
| 4,624,012 | 11/1986 | Lin et al. | 395/2 |
| 4,788,649 | 11/1988 | Shea et al. | 395/2 |
| 4,802,221 | 1/1989 | Jibbe | 381/34 |
| 4,809,329 | 2/1989 | Walliker et al. | 381/41 |

*Primary Examiner*—Allen R. MacDonald
*Assistant Examiner*—Michelle Doerrler
*Attorney, Agent, or Firm*—Marger, Johnson, McCollom & Stolowitz

[57] ABSTRACT

A method and an apparatus for hearing assistance, capable of compensating the lowering of the speech recognition ability related to the deterioration of the auditory sense center. The input speech is divided into voiced speech sections, unvoiced speech sections, and silent sections, of which the voiced speech sections and the silent sections are appropriately extended/contracted while the unvoiced speech sections are left unchanged, and then these sections are combined in an identical order as in the input speech, so as to obtain output speech which is easier to listen for a listener with a handicapped hearing ability. Also, only the silent sections other than the punctuation silent sections for pauses due to punctuation between sentences can be contracted and the speech speed for each of the voiced speech sections can be adjusted, and then the adjusted voiced speech sections, the unvoiced speech sections, the punctuation silent sections and the contracted silent sections can be combined in an identical order as in the input speech, in order to realize the real time hearing assistance without extending the speech utterance period.

17 Claims, 8 Drawing Sheets

METHOD AND APPARATUS FOR HEARING ASSISTANCE WITH SPEECH SPEED CONTROL FUNCTION

BACKGROUND OF THE INVENTION

1. Field of the Invention

The present invention relates to a method and an apparatus for assisting the hearing of persons with hearing impairment or advanced age.

2. Description of the Background Art

In general, when the hearing ability such as a critical speed for speech recognition (a maximum speech speed for which the speech can be recognized correctly) is lowered due to the hearing impairment or the advanced age, the rate of correct speech recognition for the speeches uttered at normal speech speed or faster than normal speech speed considerably decreases.

Conventionally, a hearing aid device has been the only means for providing an assistance to such a person with handicapped hearing ability. However, the conventional hearing aid device functions only to compensate the transmission characteristics of the external ear and the middle ear in the auditory sense system by means of simple frequency characteristic improvement and gain control, so that it has been impossible for a conventional hearing aid device to compensate the lowering of the speech recognition ability related to the deterioration of the central auditory sense system.

In this respect, it is possible to make it easier for those who have the handicapped hearing ability to hear the speech correctly, by lowering the speech speed uniformly while maintaining the other speech characteristics.

However, when the speech speed is lowered uniformly, the speech utterance period is inevitably extended, and such an extended speech utterance period can cause the serious problem in a case of broadcasting or tape recording in which the period of time available for the utterance of the speech is limited in advance.

In addition, such a slowed down speech utterance can cause the further serious problem in a case of the TV broadcasting in which the speech is delivered in correspondence to the displayed visual information, such that the discrepancy between the slowed down speech utterance and the normal speed visual information may cause the confusion which rather obstructs the hearing.

SUMMARY OF THE INVENTION

It is therefore an object of the present invention to provide a method and an apparatus for hearing assistance, capable of compensating the lowering of the speech recognition ability related to the deterioration of the central auditory sense system.

It is another object of the present invention to provide a method and an apparatus for hearing assistance, capable of realizing the effective hearing assistance without causing the extension of the speech utterance period.

According to one aspect of the present invention there is provided a method of hearing assistance, comprising the steps of: dividing input speech into voiced speech sections, unvoiced speech sections, and silent sections; subdividing each voiced speech section into pitch sub-sections according to pitch periods in said each voiced speech section; extending/contracting each pitch sub-section of each voiced speech section by a first extension/contraction rate to obtain extended/contracted voiced speech sections; extending/contracting each silent section by a second extension/contraction rate to obtain extended/contracted silent sections; and combining the extended/contracted voiced speech sections, the unvoiced speech sections, and the extended/contracted silent sections, in an identical order as in the input speech, so as to obtain output speech which is easier to listen for a listener with a handicapped hearing ability.

According to another aspect of the present invention there is provided an apparatus for hearing assistance, comprising: means for dividing input speech into voiced speech sections, unvoiced speech sections, and silent sections; means for subdividing each voiced speech section into pitch sub-sections according to pitch periods in each voiced speech section; means for extending/contracting each pitch sub-section of each voiced speech section by a first extension/contraction rate to obtain extended/contracted voiced speech sections; means for extending/contracting each silent section by a second extension/contraction rate to obtain extended/contracted silent sections; and means for combining the extended/contracted voiced speech sections, the unvoiced speech sections, and the extended/contracted silent sections, in an identical order as in the input speech, so as to obtain output speech which is easier to listen for a listener with a handicapped hearing ability.

According to another aspect of the present invention there is provided a method of hearing assistance, comprising the step of: dividing input speech into voiced speech sections, unvoiced speech sections, and silent sections; selecting punctuation silent sections for pauses due to punctuation between sentences among the silent sections; contracting each of the silent sections other than the punctuation silent sections into a contracted silent section; changing speech speed for each of the voiced speech sections to obtain adjusted voiced speech sections; and combining the adjusted voiced speech sections, the unvoiced speech sections, the punctuation silent sections, and the contracted silent sections, in an identical order as in the input speech, so as to obtain output speech which is easier to listen for a listener with a handicapped hearing ability.

According to another aspect of the present invention there is provided an apparatus of hearing assistance, comprising the step of: means for dividing the input speech into voiced speech sections, unvoiced speech sections, and silent sections; means for selecting punctuation silent sections for pauses due to punctuation between sentences among the silent sections; means for contracting each of the silent sections other than the punctuation silent sections into a contracted silent section; means for changing speech speed for each of the voiced speech sections to obtain adjusted voiced speech sections; and means for combining the adjusted voiced speech sections, the unvoiced speech sections, the punctuation silent sections, and the contracted silent sections, in an identical order as in the input speech, so as to obtain output speech which is easier to listen for a listener with a handicapped hearing ability.

Other features and advantages of the present invention will become apparent from the following description taken in conjunction with the accompanying drawings.

DETAILED DESCRIPTION OF THE PREFERRED EMBODIMENTS

Figure 1:
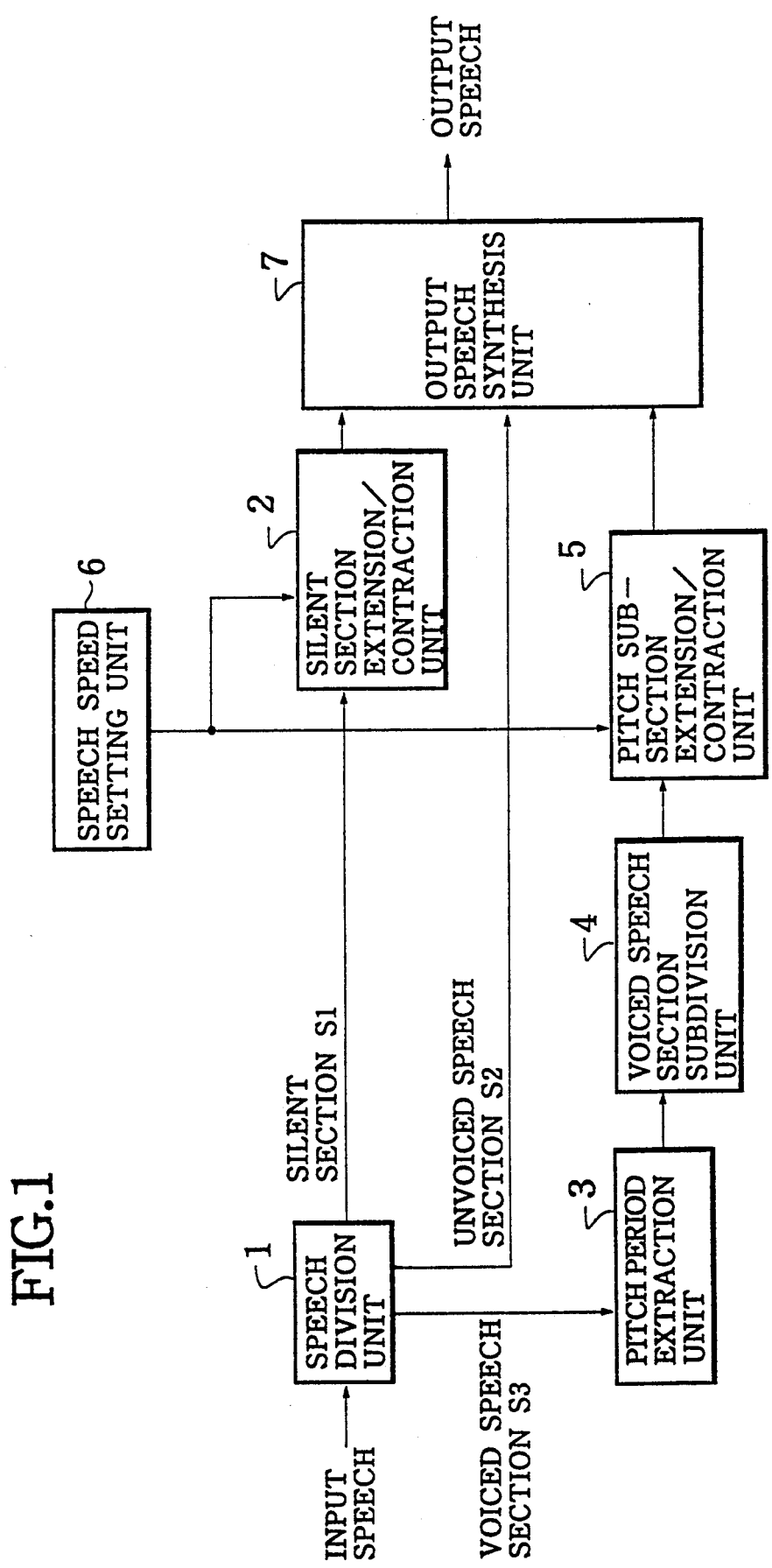
FIG. 1 is a block diagram of a first embodiment of an apparatus for hearing assistance according to the present invention.

Referring now to FIG. 1, a first embodiment of an apparatus for hearing assistance according to the present invention will be described in detail.

This apparatus for hearing assistance shown in FIG. 1 comprises: a speech division unit 1 for dividing the input speech into voiced speech sections, unvoiced speech sections, and silent sections; a silent section extension/contraction unit 2 for extending/contracting the length of each silent section obtained by the speech division unit 1; a pitch period extraction unit 3 for extracting pitch periods in each voiced speech section obtained by the speech division unit 1; a voiced speech section subdivision unit 4 for subdividing each voiced speech section obtained by the speech division unit 1 into pitch sub-sections according to the pitch periods obtained by the pitch period extraction unit 3; a pitch sub-section extension/contraction unit 5 for extending/contracting the length of each pitch sub-section obtained by the voiced speech section subdivision unit 4; a speech speed setting unit 6 for setting extension/contraction rates to be used at the silent section extension/contraction unit 2 and the pitch sub-section extension/contraction unit 5; and an output speech synthesis unit 7 for combining the extended/contracted silent sections outputted from the silent section extension/contraction unit 2, the unvoiced speech sections obtained by the speech division unit 1, and the extended/contracted voiced speech sections outputted from the pitch sub-section extension/contraction unit 5, in the identical order as in the input speech, to obtain the output speech.

This apparatus for hearing assistance shown in FIG. 1 operates as follows.

First, when the input speech in the normal speech speed is entered into the speech division unit 1, the speech division unit 1 divides the input speech into the silent sections S1, the unvoiced speech sections S2, and voiced speech sections S3.

Then, the silent section extension/contraction unit 2 extends/contracts the length of each silent section S1 obtained by the speech division unit 1 at the silent section extension/contraction rate determined by the the speech speed setting unit 6 according to the original speech speed of the input speech and the hearing ability of the listener.

On the other hand, the pitch period extraction unit 3 extracts the pitch periods in each voiced speech section S3, and the voiced speech section subdivision unit 4 subdivides each voiced speech section S1 into pitch sub-sections according to the pitch periods obtained by the pitch period extraction unit 3. Then, the pitch sub-section extension/contraction unit 5 extends/contracts the length of each pitch sub-section obtained by the voiced speech section subdivision unit 4 at the speech section extension/contraction rate determined by the the speech speed setting unit 6 according to the original speech speed of the input speech and the hearing ability of the listener. Here, in a case of extending each pitch sub-section at the pitch sub-section extension/contraction unit 5, the extension of each pitch sub-section is achieved by repeating each pitch sub-section for a specific number of times determined by the speech section extension/contraction rate.

As for the unvoiced speech sections S2 obtained by the speech division unit 1, no extension/contraction is made on the unvoiced speech sections S2 in order to retain the individuality and the phonemic characteristics of the speaker of the input speech in the output speech.

Finally, the output speech synthesis unit 7 combines the extended/contracted silent sections outputted from the silent section extension/contraction unit 2, the unvoiced speech sections obtained by the speech division unit 1, and the extended/contracted voiced speech sections outputted from the pitch sub-section extension/contraction unit 5, in the identical order as in the input speech, to obtain the output speech.

As a result, the output speech obtained by the output speech synthesis unit 7 has the speech speed adjusted according to the hearing ability of the listener. Consequently, according to this first embodiment, it becomes possible to assist the hearing of the listener by compensating the lowering of the speech recognition ability of the listener suffering from the deterioration of the central auditory sense system.

Now, the first embodiment of an apparatus for hearing assistance described above actually requires a large amount of calculation processings to be carried out, so that it is necessary to implement the first embodiment on a large scale computer, but such a large computer implementation in turn requires a considerable amount of processing time, so that a real time hearing assistance operation is difficult, and the input of the input speech can be continued only within a predetermined finite period of time dictated by the available memory capacity. Moreover, such a large scale computer implementation severely limits the portability and the maneuverability of the apparatus.

In view of such difficult circumstances surrounding the first embodiment, referring now to FIG. 2, a second embodiment of an apparatus for hearing assistance according to the present invention which resolve these difficult circumstances encountered in the first embodiment will be described in detail.

In this second embodiment, the apparatus is formed by a plurality of very compact transputer modules (parallel processing ICs), and the shortening of the processing time is achieved by optimally distributing the required signal processing algorithms among these plurality of transputer modules, so as to realize a real time hearing assistance operation. Consequently, the input of the input speech can be continued indefinitely. In addition, the apparatus can be implemented in a compact and light weighted portable configuration. Moreover, the user can change the speech speed at any desired rate at which he/she would like to hear by a simple manual operation, so that the maneuverability of the apparatus can also be improved.

Figure 2:
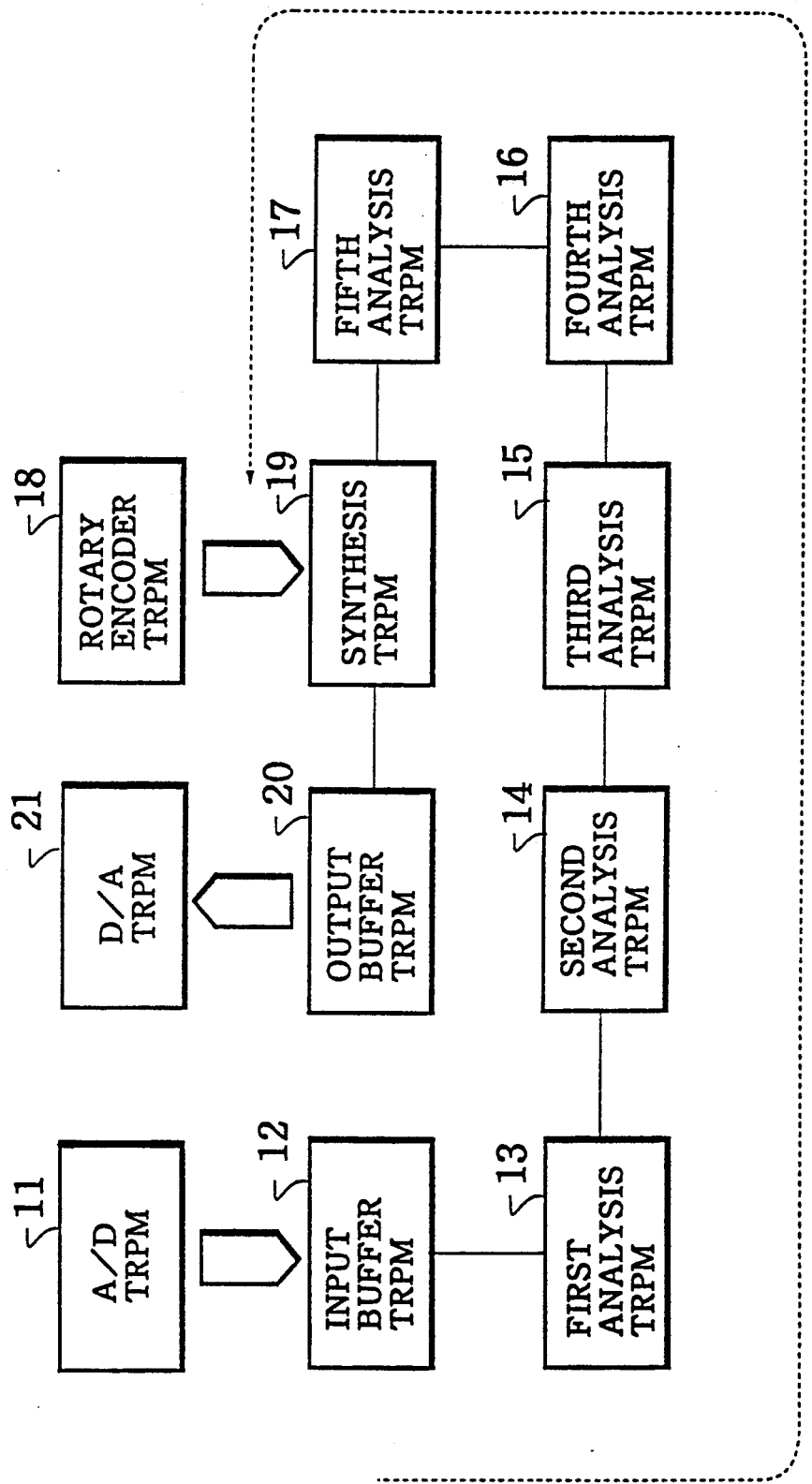
FIG. 2 is a block diagram of a second embodiment of an apparatus for hearing assistance according to the present invention.

In the block diagram of FIG. 2, each box represents a transputer module (TRPM) for executing the assigned signal processing algorithm at the high speed continuously. Here, for example, each transputer module can be realized by a commercially available transputer module TRPM-401 manufactured by the Concurrent Systems Inc. which is equipped with a high speed processor, memory, interface, and four serial communication links.

This apparatus for hearing assistance shown in FIG. 2 comprises: an A/D conversion TRPM 11 for receiving the input speech; an input buffer TRPM 12 connected to the A/D conversion TRPM 11; first to fifth analysis TRPMs 13 to 17 connected in series, of which the first analysis TRPM 13 is connected with the input buffer TRPM 12; a synthesis TRPM 19 connected with the fifth analysis TRPM 17; an output buffer TRPM 20 connected with the synthesis TRPM 19; a D/A conversion TRPM 21 connected with the output buffer TRPM 20; and a rotary encoder TRPM 18 connected to the synthesis TRPM 19.

The A/D conversion TRPM 11 receives the externally supplied input speech, and applies the 16 bit quantization and the A/D conversion at the sampling frequency of 48 KHz to the received input speech to obtain A/D converted time series speech data.

The input buffer TRPM 12 carries out the buffering on the A/D converted time series speech data obtained by the A/D conversion TRPM 11 for the purpose of carrying out the subsequent processing in units of frames. This is achieved by temporarily storing the A/D converted time series speech data until a data length equal to one frame is obtained.

The first analysis TRPM 13, which functions as the speech division unit 1 of the first embodiment, calculates an average power and a number of zero crossings, as well as an auto-correlation function if necessary, for the time series speech data entered from the input buffer TRPM 12 in every few milliseconds, and divides the input speech into the silent frames, the unvoiced speech frames, and the voiced speech frames, according to the prescribed threshold values for the calculated average power, number of zero crossings, and auto-correlation function for the entered input speech.

More specifically, the division of the input speech can be made by the following sequential procedure.

(1) It is judged to be the silent frame when the average power is less than a prescribed lower threshold Pmin.

(2) It is judged to be the voiced speech frame when the average power is greater than a prescribed upper threshold Pmax.

(3) It is judged to be the unvoiced speech frame when the number of zero crossings is greater than a prescribed upper threshold Smax.

(4) It is judged to be the voiced speech frame when the number of zero crossings is less than a prescribed lower threshold Smin.

(5) The auto-correlation function $R(\tau)$ is calculated, and it is judged to be the unvoiced speech frame when a voicedness $V = R(\tau)max/R(O)$ is greater than a prescribed threshold Vmax, where $R(\tau)$max is the maximum value of the calculated auto-correlation function $R(\tau)$ for $\tau > 0$.

(6) It is judged to be the unvoiced speech frame when it is none of (1) to (5) described above.

Then, for each voiced speech frame, the auto-correlation functions are calculated by using nine different analysis window widths on the waveform of the portion with the large power within the frame, and the above described voicedness V and the time lag $\tau$ are calculated for each of the calculated auto-correlation functions. Then, the tentative pitch period to be used in the subsequent processing is determined as the most reliable value of the time lag $\tau$ for each voiced speech frame, in view of the size of the voicedness V and the variation of the time lags $\tau$.

The second analysis TRPM 14 carries out the decimation to reduce the amount of processing required in extracting pitches in the waveform of each voiced speech frame, for the purpose of increasing the processing speed.

For example, for the setting of the decimation rate equal to m, the digital low pass filtering is carried out at the cut off frequency equal to $\frac{1}{2}$m of the original sampling frequency fs. Then, one point in every m points are extracted from the waveform to obtain a decimated waveform with the effective sampling frequency equal to fs/m. In this manner, the amount of data involved in the subsequent processing can be reduced to 1/m timewise as well as frequency-wise.

The third analysis TRPM 15 calculates the auto-correlation functions $R(\tau)$ for the decimated waveform of the decimated time series speech data obtained by the second analysis TRPM 14 in every few milliseconds, obtains two local maxima in a vicinity of the tentative pitch period $\tau$ obtained by the first analysis TRPM 13 as pitch period candidates for each voiced speech frame, selects one of the pitch period candidates as the pitch period for each voiced speech frame by considering the continuity over the entire voiced speech section, and determines a trajectory of the pitch frequency (an inverse of the determined pitch period) for all the voiced speech frames in the input speech.

The fourth analysis TRPM 16 obtains the pitch period from the starting point of each voiced speech section, and subdivides the waveform of each voiced speech section in units of pitch sub-sections as follows. First, the smoothing is applied to the pitch frequency trajectory obtained at the third analysis TRPM 15. Then, the low pass filtering of the decimated waveform is carried out at the cut off frequency slightly higher than the smoothed pitch frequency for each voiced speech frame, and the waveform for the voiced speech section as a whole in a form of a continuous approximately sinusoidal wave is obtained by connecting the low pass filtered waveforms. Then, a scale for the pitch period is constructed by carrying out the peak picking of the obtained waveform from the starting point. Finally, a starting point of each pitch sub-section is determined by using the scale for the pitch period such that the starting point of each pitch sub-section is located at the zero crossing point immediately before the maximum amplitude of the waveform within one pitch period, starting from the portion in the waveform for which the frequency and power of the waveform at the central portion of the voiced speech section are stabilized.

The fifth analysis TRPM 17 carries out the fine adjustment operation such as the error correction in which the starting point of the first pitch sub-section in the voiced speech section obtained by the fourth analysis TRPM 16 is adjusted to coincide with the starting point of the voiced speech section, and the ending point of the last pitch sub-section in the voiced speech section obtained by the fourth analysis TRPM 16 is adjusted to coincide with the ending point of the voiced speech section, so as to finally determine the silent sections S1, the unvoiced speech sections S2, the voiced speech sections S3, and the pitch sub-sections in each voiced speech section S3 similar to those used in the first embodiment described above, according to the starting point of each pitch sub-section determined by the fourth analysis TRPM 16. The fifth analysis TRPM 17 then outputs the starting points, the ending points, pitch sub-section division, and a number of pitch sub-sections in each voiced speech section.

Thus, these third, fourth, and fifth analysis TRPMs 15, 16, and 17 function as the pitch period extraction unit 3 and the voiced speech section subdivision unit 4 of the first embodiment.

The rotary encoder TRPM 18, which functions as the speech speed setting unit 6 of the first embodiment, has two digital volume switches (not shown) realizing the precision of the 8 bit quantization for the silent section and voiced speech section extension/contraction rates according to the desired speech speed specified by the user by means of a manual operation of digital volume switches, and supplies the quantized extension/contraction rates.

Here, the digital volume switches of the rotary encoder TRPM 18 output the integer value X in a range between 0 to 255, according to the amount by which the digital volume switches are turned by the manual operation. The silent section and voiced speech section extension/contraction rates are then specified by using the appropriate conversion formula. For example, when the voiced speech section extension/contraction rate is to be controlled within a range of 1.0 to 1.4 while the silent section extension/contraction rate is to be controlled within a range of 1.0 to 3.0, the following formula can be used.

$$\text{Voiced speech section extension/contraction rate} = \frac{0.4}{255} \cdot X + 1.0$$

$$\text{Silent section extension/contraction rate} = \frac{2.0}{255} \cdot X + 1.0$$

The synthesis TRPM 19 extends/contracts the silent sections supplied from the fifth analysis TRPM 17 according to the silent section extension/contraction rate specified by the rotary encoder TRPM 18, and extends/contracts the voiced speech sections supplied from the fifth analysis TRPM 17 according to the voiced speech section extension/contraction rate specified by the rotary encoder TRPM 18, while leaving the unvoiced speech sections supplied from the fifth analysis TRPM 17 as they are, and then combines the extended/contracted silent sections, the unvoiced speech sections, and the extended/contracted voiced speech sections, in the identical order as in the input speech, to obtain the output speech signals.

Thus, this synthesis TRPM 19 functions as the silent section extension/contraction unit 2, the pitch sub-section extension/contraction unit 5, and the output speech synthesis unit 7 of the first embodiment.

More specifically, the extension/contraction of the silent section and the voiced speech section is achieved as follows.

In a case of extending the silent section with the length i to be m (m>1) times longer, digital 0 values are inserted for the length of (m−1)·i at a center of the silent section.

Figure 3A:
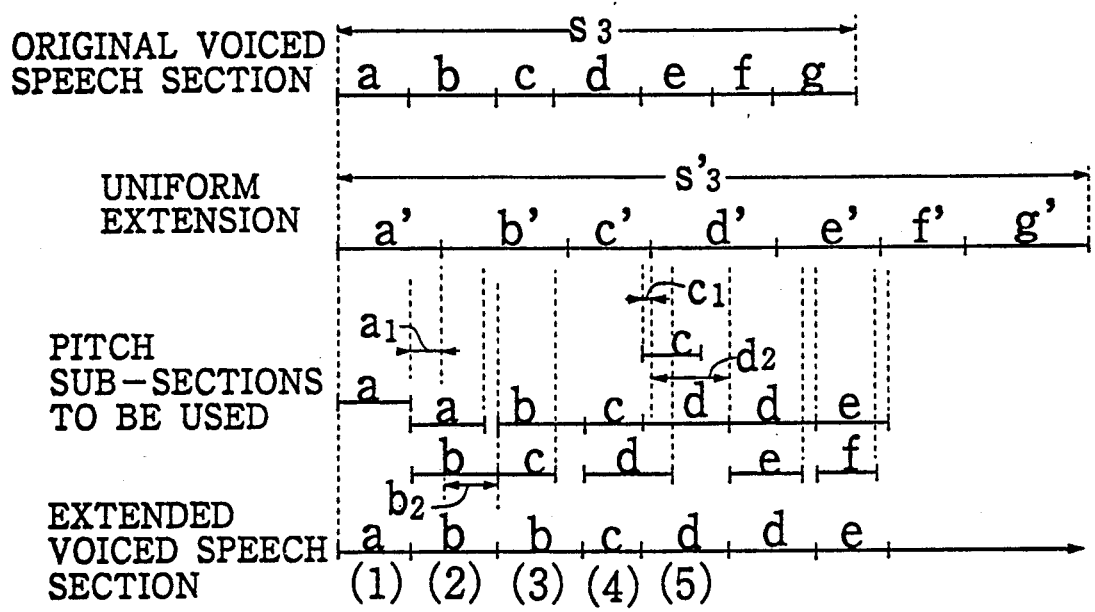
FIG. 3A is a diagram for explaining a case of extending silent and voiced speech sections in the apparatus of FIG. 2.

On the other hand, the extension of the voiced speech section is achieved as shown in FIG. 3A. Namely, for the original voiced speech section S3=a+b+c+d+e+f+g, where a, b, c, d, e, f, g are pitch sub-sections, the uniform extension S3'=a'+b'+c'+d'+e'+f'+g' has each pitch period extended, so that the pitch of the speech would be lowered. In order to maintain the pitch of the speech, the voiced speech section S3 as a whole is extended by repeating selected pitch sub-sections contained in the voiced speech section S3 while retaining the length of individual pitch sub-section.

Here, the selected pitch sub-sections to be repeated are selected as follows. Namely, each adjacent pitch sub-sections x and y in the original voiced speech section S3 are compared with the corresponding pitch subsections x' and y' in the uniform extension S3', to determine the overlapping length x1 between x and x' and the overlapping length y2 between y and y'. Then, the pitch sub-section x is selected for the repetition when $x1/x \geq y2/y$, whereas the pitch sub-section y is selected for the repetition when x1 x<y2/y.

Thus, in the example shown in FIG. 3A, the pitch sub-sections to be repeated are determined by the following sequence.

(1) The first pitch sub-section a is used at the beginning.

(2) For the second pitch sub-section, either a or b should be selected. In this case, a1/a is smaller than b2/b, so that the pitch sub-section b is selected next.

(3) For the third pitch sub-section, either b or c should be selected. In this case, c does not overlap with c', so that the pitch sub-section b is selected again.

(4) For the fourth pitch sub-section, either c or d should be selected. In this case, c overlaps with c' completely, so that the pitch sub-section c is selected next.

(5) For the fifth pitched sub-section, either c or d should be selected. In this case, c1/c is smaller than d2/d, so that the pitch sub-section d is selected next.

The process similar to these are continued until the total length of the extended voiced speech section exceeds the length of the uniform extension S3'.

In a case of contracting the silent section with the length i to be m (m<1) times shorter, the waveform is deleted for the length of (1−m)·i at a center of the silent section.

Figure 3B:
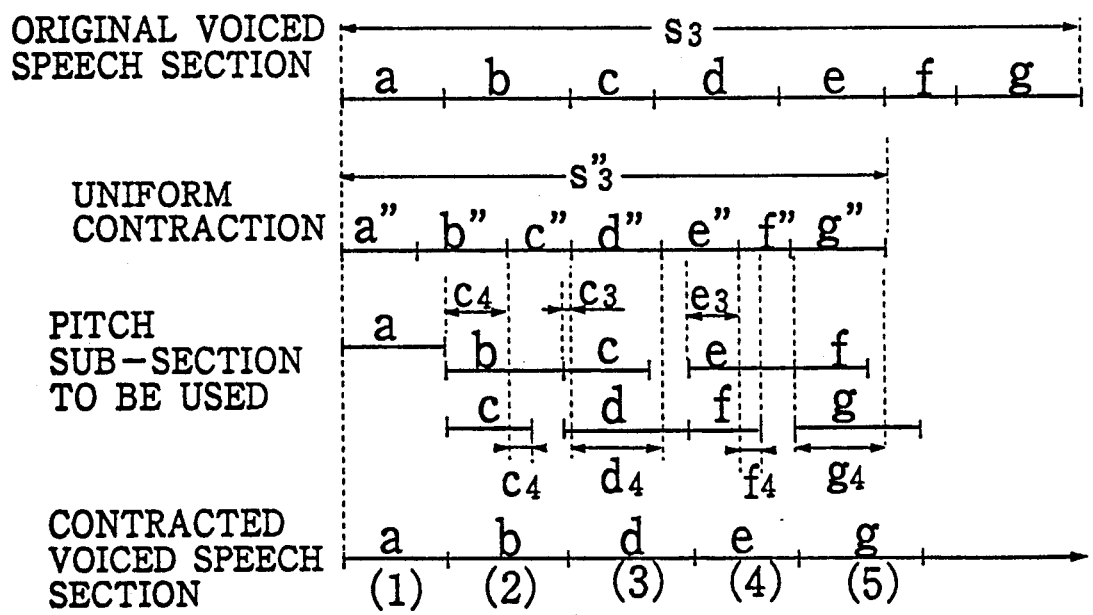
FIG. 3B is a diagram for explaining a case of contracting silent and voiced speech sections in the apparatus of FIG. 2.

On the other hand, the contraction of the voiced speech section is achieved as shown in FIG. 3B. Namely, for the original voiced speech section S3=a+b+c+d+e+f+g, where a, b, c, d, e, f, g are pitch sub-sections, the uniform contraction S3''=a''+b''+c''+d''+e''+f''+g'' has each pitch period contracted, so that the pitch of the speech would be raised. In order to maintain the pitch of the speech, the voiced speech section S3 as a whole is contracted by deleting selected pitch sub-sections contained in the voiced speech section S3 while retaining the length of individual pitch sub-section.

Here, the selected pitch sub-sections to be deleted are selected as follows. Namely, each adjacent pitch sub-sections x and y in the original voiced speech section S3 are compared with the corresponding pitch subsections x'' and y'' in the uniform contraction S3'', to determine the overlapping length x3 between x and x'' and the overlapping length y4 between y and y''. Then, the pitch sub-section x is selected for the next pitch subsection when $x3/x \geq y4/y$, whereas the pitch sub-section x is selected for the deletion when $x3/x < y4/y$ in which case the pitch sub-section y is selected for the next pitch sub-section.

Thus, in the example shown in FIG. 3B, the pitch sub-sections to be deleted are determined by the following sequence.

(1) The first pitch sub-section a is used at the beginning.

(2) For the second pitch sub-section, either b or c should be selected. In this case, b3/b is greater than c4/c, so that b is selected for the pitch sub-section to be used next.

(3) For the third pitch sub-section, either c or d should be selected. In this case, c3/c is smaller than d4/d, so that c is selected for the deletion and d is selected for the pitch sub-section to be used next.

(4) For the fourth pitch sub-section, either e or f should be selected. In this case, e3/e is greater than f4/f, so that e is selected for the pitch sub-section to be used next.

(5) For the fifth pitched sub-section, either f or g should be selected. In this case, f does not overlap with f' and therefore f3/f is equal to zero, so that f is selected for the deletion and g is selected for the pitch sub-section to be used next.

The process similar to these are continued until the total length of the extended voiced speech section exceeds the length of the uniform contraction S3''.

The output buffer TRPM 20 carries out the buffering on the output speech signals obtained by the synthesis TRPM 19, for the purpose of temporarily storing the extra length of the extended output speech signals.

Finally, the D/A conversion TRPM 21 applies the D/A conversion on the output speech signals supplied from the output buffer TRPM 20, so as to obtain the analogue output speech to be outputted from the apparatus.

Thus, this apparatus of the second embodiment shown in FIG. 2 operates substantially similarly to the apparatus of the first embodiment shown in FIG. 1 described above.

Namely, the input speech in the normal speech speed is divided into the silent section S1, the unvoiced speech section S2, and voiced speech section S3. Then, the length of each silent section S1 is extended/contracted by the silent section extension/contraction rate determined according to the desired speech speed specified by the user, and the voiced speech sections S3 are divided into the pitch sub-sections and the length of each pitch sub-section is extended/contracted by the voiced speech section extension/contraction rate determined according to the desired speech speed specified by the user, while the unvoiced speech sections S2 are left unchanged, in order to retain the individuality and the phonemic characteristics of the speaker of the input speech in the output speech. Then, the extended/contracted silent sections, the unvoiced speech sections, and the extended/contracted voiced speech sections are combined together in the identical order as in the input speech, to obtain the output speech.

As a result, the output speech outputted from this apparatus of the second embodiment has the speech speed adjusted to the desired speech speed specified by the user, and consequently, just as in the first embodiment described above, it also becomes possible in this second embodiment to assist the hearing of the listener by compensating the lowering of the speech recognition ability of the listener suffering from the deterioration of the central auditory sense system.

In addition, according to this second embodiment, the apparatus is formed by a plurality of very compact transputer modules and the shortening of the processing time is achieved by optimally distributing the required signal processing algorithms among these plurality of transputer modules, so that it becomes possible to realize a real time hearing assistance operation, while the apparatus can be implemented in a compact and light weighted portable configuration. Furthermore, the user can change the speech speed at any desired level by a simple manual operation, so that the maneuverability of the apparatus can also be improved.

Figure 4:
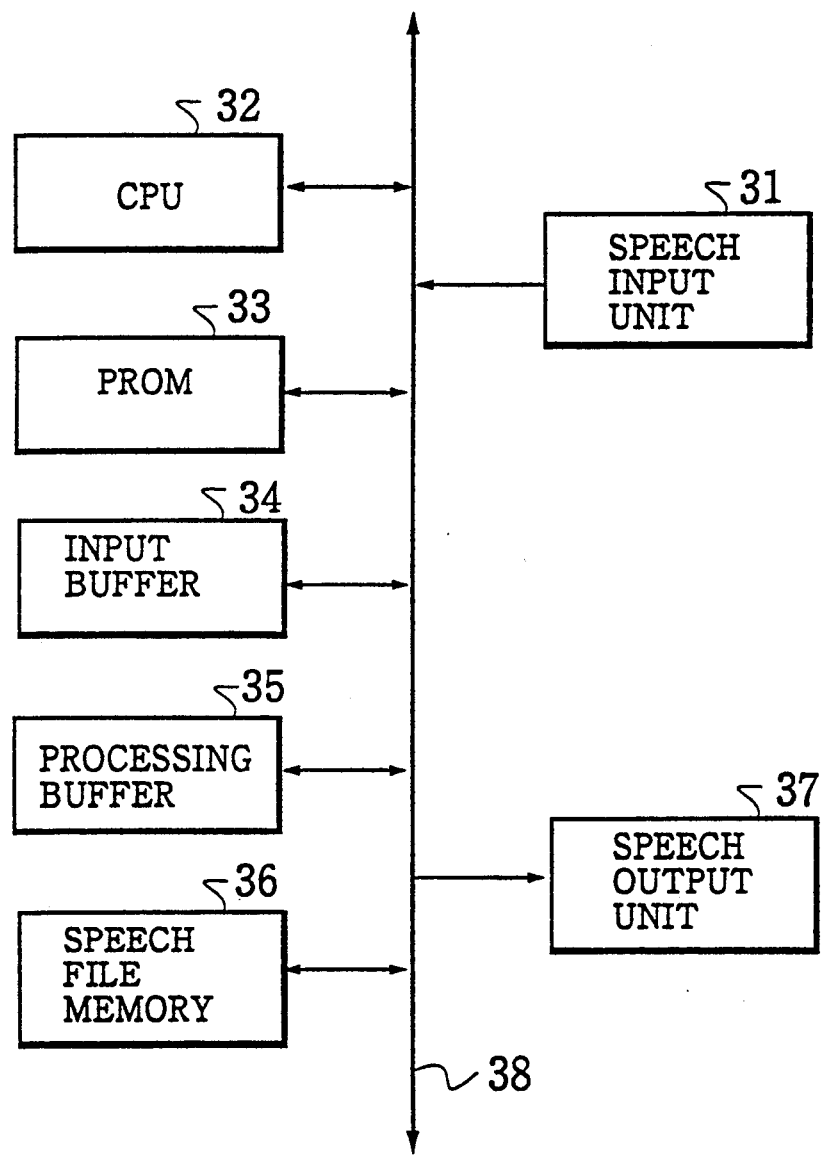
FIG. 4 is a block diagram of a third embodiment of an apparatus for hearing assistance according to the present invention.

Referring now to FIG. 4, a third embodiment of an apparatus for hearing assistance according to the present invention will be described in detail.

This apparatus for hearing assistance shown in FIG. 4 comprises: a speech input unit 31, a CPU (Central Processing Unit) 32, a PROM (Programmable Read Only Memory) 33, an input buffer 34, a processing buffer 35, a speech file memory 36, and a speech output unit 37, all of which are interconnected through a bus line 38.

The speech input unit 31 has a known configuration for entering the input speech into the apparatus, which includes microphone, tone modulator, A/D converter, speech recorder, speech memory (such as IC memory, hard disk, floppy disk, or VTR), and interface circuit.

The CPU 32 controls the operation of the apparatus as a whole and execute various processings required in the apparatus, which can be formed by a known one chip computer or personal computer.

The PROM 33 stores the control program to be executed by the CPU 32 as well as data to be utilized in the operation of the CPU 32.

The input buffer 34 temporarily stores the digital input speech signals entered from the speech input unit 31 in units of frames, while the processing buffer 35 stores the digital speech signals outputted from the input buffer 34 in units of speech segments during the processing in the apparatus. These input buffer 34 and the processing buffer 35 can be formed within a RAM (Random Access Memory) (not shown) to be used as a work area of the CPU 32.

The speech file memory 36 stores the speech signals processed in the apparatus, which can be formed by the above described RAM, or a separate memory device such as IC memory or floppy disk.

The speech output unit 37 has a known configuration for outputting the output speech from the apparatus according to the speech signals stored in the speech file memory 36, which includes interface circuit, D/A converter, speaker, and speech recorder.

Now, in this third embodiment, the speech is processed such that the silent sections between the speech sections are shortened within the limit of the naturalness on hearing, in order to make a room for the speech sections to be extended within the given period available for the utterance of the speech.

Then, the speech speed is adjusted as follows. First, the speech speed is adjusted according to the change of the pitch (fundamental frequency) of the speech sound, such that the speech speed is made slower for the section with the higher pitch and the speech speed is made faster for the section with the lower pitch. This adjustment is effective because the sections containing more important meanings are usually uttered at higher pitches.

In addition, a period between a start of a series of utterances and an end of a series of utterances is regard as one speech segment and the speech speed is set at a slower level at the beginning of the speech segment and then gradually increased toward the end of the speech segment, by following the global change of the pitch of the speech sound. This adjustment is effective because the utterance of the speech usually starts at the higher pitch.

More specifically, such a processing of the speech and an adjustment of the speech speed can be realized by operating the apparatus of FIG. 4 according to the flow chart of FIG. 5, as follows.

First, at the step S1, the input speech entered at the speech input unit 31 are divided up in units of frames, and each frame of the digital input speech signals from the speech input unit 31 is stored in the input buffer 34, frame by frame. In this third embodiment, the length of each frame is set to be 3.3 ms.

Next, at the step S2, each frame stored in the input buffer 34 at the step S1 is judged as one of voiced speech frame, unvoiced speech frame, and silent frame. Here, the judgement can be made by using the known method such as the auto-correlation method or the zero crossing method. In this judgement, in principle, all the sounds other than the voiced and unvoiced speeches uttered by a human speaker, such as the low level noise or the background sound, are regarded as silent.

Then, at the step S3, whether the type of the frame determined at the step S2 is the same as the type of the immediately previous frame or not is determined. In a case it is the same as the immediately previous one, the process returns to the step S1 for the next frame, whereas otherwise the process proceeds to the step S4 next. As a result, the successive frames of the same type are piled up in the input buffer 34 until the frame of the different type is encountered.

At the step S4, first, second, and third threshold values Th1, Th2, and Th3 to be utilized in the subsequent steps as will be described below are determined according to an average mora number uttered in one second. Here, one mora is equivalent to the length of one syllable containing a short vowel, which approximately corresponds to one kana (the Japanese syllabary) in Japanese (or two kanas in a case of involving contracted sounds). It is to be noted that this step S4 may not necessarily be carried out for every frame, and can be carried out just once at the beginning, or can be carried out once in each of the predetermined period of time.

Next, at the step S5, the frames of the same type piled up in the input buffer 34 up until the frame of different type is encountered at the step S3 are classified as one of the silent section ($a_i$), unvoiced speech section ($b_i$), and voiced speech section ($c_i$), and in a case of the silent section the process proceeds to the steps S13 to S15, in a case of the unvoiced speech section the process proceeds to the step S12, and in a case of the voiced speech section the process proceeds to the steps S6 to S11.

Figure 6:
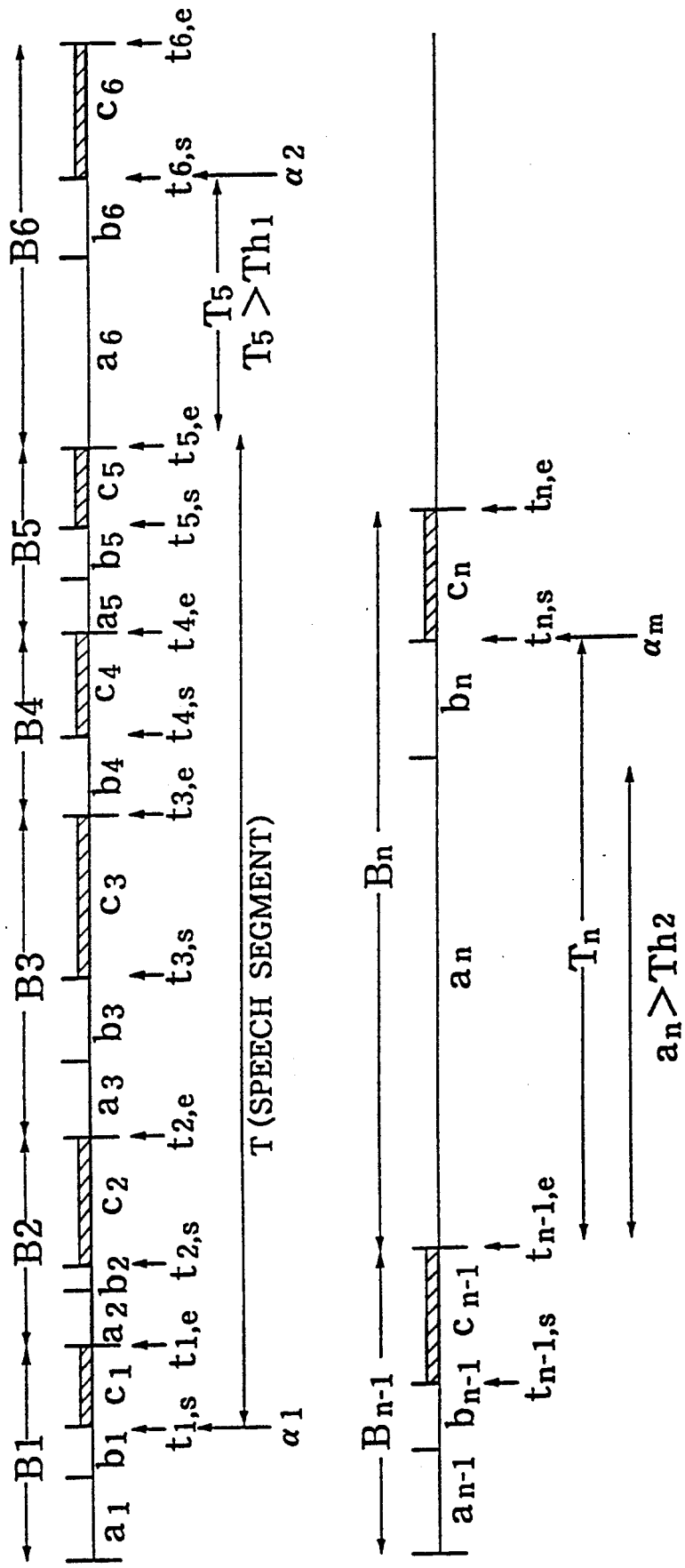
FIG. 6 is a diagram showing the speech sections of the speech to be processed by the apparatus of FIG. 4 in the procedure of FIG. 5.

By these subsequent steps, each section is appropriately processed as will be described below, and the processed sections are sequentially stored in the processing buffer 35, as shown in FIG. 6, by the steps S11, S12, and S13.

In FIG. 6, each portion starting from a beginning of either the silent section $a_i$ or the unvoiced speech section $b_i$ and ending at an end of the voiced speech section $c_i$ is designated as one block ($B_i$; i=1, 2, ..., n), while a starting time and an ending time of each voiced speech section $c_i$ is designated as $t_{i,s}$ and $t_{i,\theta}$.

Now, in a case the section stored in the input buffer 34 at the step S5 is the voiced speech section, the process proceeds as follows.

At the step S6, for the i-th voiced speech section $c_i$, a time interval $T_i = t_{i,s} - t_{i-1,\theta}$ between the starting time $t_{i,s}$ of the i-th voiced speech section $c_i$ and the ending time $t_{i-1,\theta}$ of the previous (i-1)-th voiced speech section $c_{i-1}$, as shown in FIG. 6, is measured.

Next, at the step S7, the time interval Ti obtained at the step S6 is compared with the first threshold value Th1 for judging the start of the speech utterance. In a case the time interval Ti is greater than the first threshold Th1, the starting time $t_{i,s}$ is judged as a start of the speech utterance $a_j$ and the process proceeds to the step S8 next, whereas otherwise the process proceeds to the step S11 to be described below. Here, for the first voiced speech section $c_1$, the time interval $T_1$ cannot be determined at the step S6, so that the process proceeds from this step S7 to the step S11, while the starting time $t_{1,s}$ is automatically judged as the first start of the speech utterance $a_1$.

Now, in the sections stored in the processing buffer 35, a portion between the previous start of the speech utterance $a_{j-1}$ and the the ending time $t_{i-1,\theta}$ of the previous voiced speech section $c_{i-1}$ is regarded as one speech segment. In FIG. 6, $T_5 = t_{6,s} - t_{5,\theta} > Th1$ so that the starting time $t_{6,s}$ is the second start of the speech utterance $a_2$ for a next speech segment of the speech segment between $t_{5,\theta}$ and $t_{1,s}$.

At the step S8, the speech segment stored in the processing buffer 35 is processed to extend the voiced speech sections in this speech segment, as follows. Namely, a length of the first voiced speech section of each speech segment is extended by a predetermined starting extension rate $r_5$ within a range of $1 \leq r_5 \leq 2$. Then, the extension rate for the subsequent voiced speech sections of this speech segment is gradually decreased toward the last voiced speech section, until the predetermined ending extension rate $r_\theta$ within a range of $0.7 \leq r_\theta \leq 1$.

Figure 7:
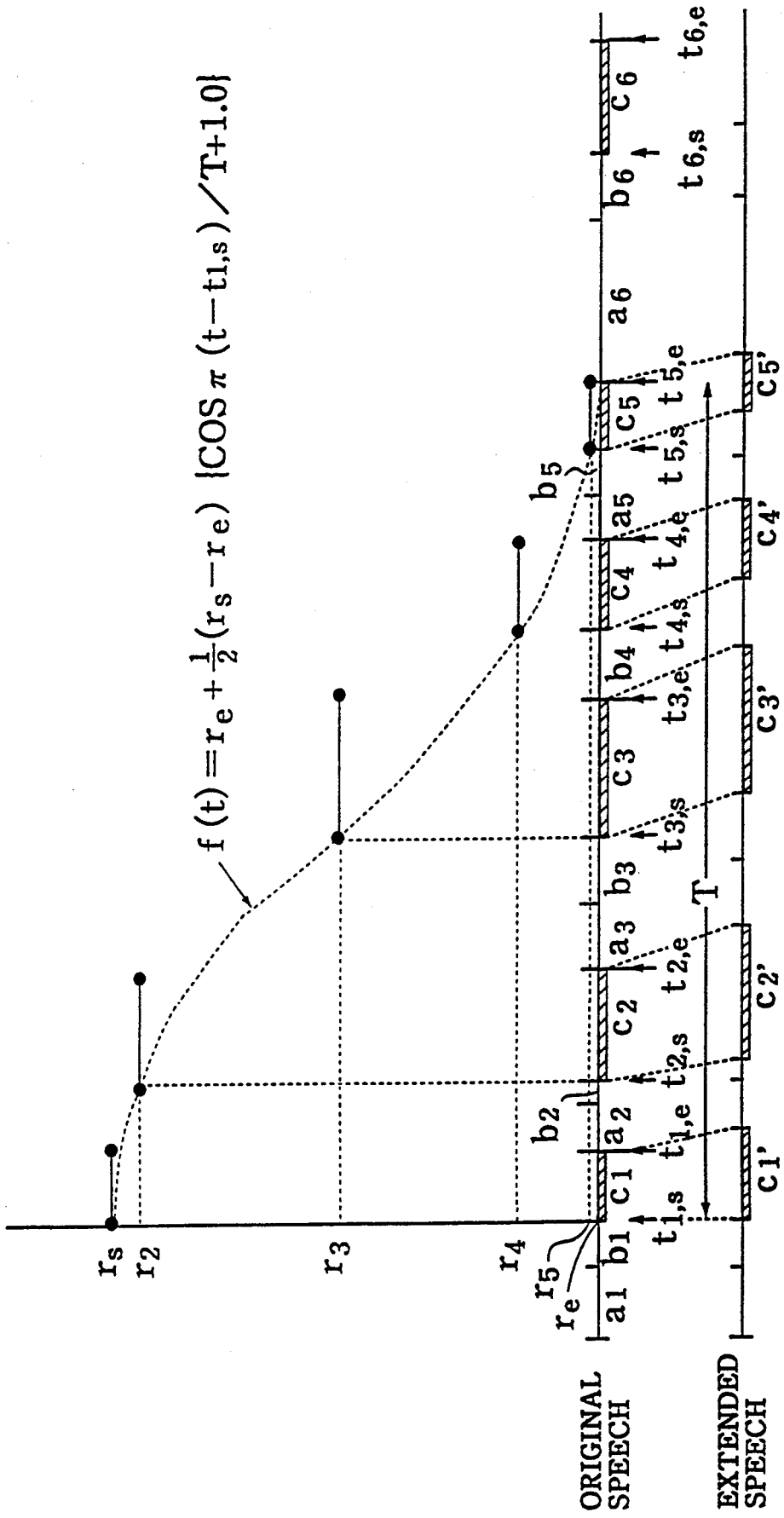
FIG. 7 is a diagram for explaining the extension of voiced speech sections of the speech by the apparatus of FIG. 4 in the procedure of FIG. 5.

As an example, a case of the first speech segment shown in FIG. 6 is shown in FIG. 7. In this example of FIG. 7, the first voiced speech section $c_1$ is extended into the first extended voiced speech section $c_1' = r_5 \cdot c_1$, the second voiced speech section $c_2$ is extended into the second extended voiced speech section $c_2' = r_2 \cdot c_2$, and so on, and the last voiced speech section $c_5$ is extended into the last extended voiced speech section $c_5' = r_5 \cdot c_5$. Note here that the ending extension rate $r_\theta$ is actually less than 1, so that the last voiced speech section $c_5$ is actually contracted. In this step S8, the silent sections $a_i$ and the unvoiced speech sections $b_i$ are left unchanged.

This processing at the step S8 is included to account for the fact that the utterance of the speech usually starts at the higher pitch, and that the more importance meanings are contained in a vicinity of the beginning of the speech segment in general, so that the slowing down of the earlier portion of the speech segment can effectively make it easier for the listener to comprehend the content of the speech.

Also, at this step S8, the speech speed is gradually changed according to a prescribed continuous function f(t), for which a cosine function given by the following equation (1) is used in the example shown in FIG. 7.

$$f(t) = r_e + \frac{1}{2}(r_s - r_e)\{\cos\pi(t - t_{i,s})/T + 1.0\} \quad (1)$$

where $t=t_{i,5}$ to $t_{i+\beta k-1}$, $\theta$, $\beta k$ is a number of voiced speech sections in the k-th speech segment, and T is a length of this speech segment. Thus, the speech speed is adjusted according to the global change of the pitch (fundamental frequency) of the speech sound represented by the function f(t), such that the speech speed is made slower for the section with the higher pitch and the speech speed is made faster for the section with the lower pitch, and the speech speed is set at a slower level at the beginning of the speech segment and then gradually increased toward the end of the speech segment, by following the global change of the pitch of the speech sound represented by the function f(t).

Then, at the step S9, the processed speech segment obtained at the step S8 is stored into the speech file memory 36, and the processing buffer 35 is cleared at the step S10.

Next, at the step S11, when the process proceeded from the step S7 to this step S11, the voiced speech section stored in the input buffer 34 is not the first voiced speech section of the speech segment but an intermediate part of the speech segment, so that this voiced speech section is stored in the processing buffer 35.

On the other hand, when the process proceeded from the step S10 to this step S11, the voiced speech section stored in the input buffer 34 is the first voiced speech section of a new speech segment, so that this voiced speech section is stored in the processing buffer 35.

In either case, after the voiced speech section in the input buffer 34 is stored in the processing buffer 35, the input buffer 34 is cleared for the sake of the processing of the next section of the speech. The process then proceeds to the step S16 to be described below.

In a case the section stored in the input buffer 34 at the step S5 is the unvoiced speech section, the process proceeds to the step S12, at which this unvoiced speech section in the input buffer 34 is transferred as it is from the input buffer 34 to the processing buffer 35, and the input buffer 34 is cleared for the sake of the processing of the next section of the speech. The process then proceeds to the step S16 to be described below. It is to be noted that the unvoiced speech sections are left unchanged in order to retain the individuality and the phonemic characteristics of the speaker of the input speech in the output speech.

In a case the section stored in the input buffer 34 at the step S5 is the silent section, the process proceeds as follows.

At the step S13, the length of this silent section $a_i$ is compared with the second threshold Th2 for judging the pause due to the punctuation between the sentences. In a case the length of this silent section $a_i$ is longer than the second threshold Th2, this silent section is judged as the pause due to the punctuation between sentences and the process proceeds to the step S14 next, whereas otherwise the process proceeds to the step S15.

At the step S14, the silent section $a_i$ judged as the pause due to the punctuation between sentences at the step S13 is contracted as follows.

Figure 8:
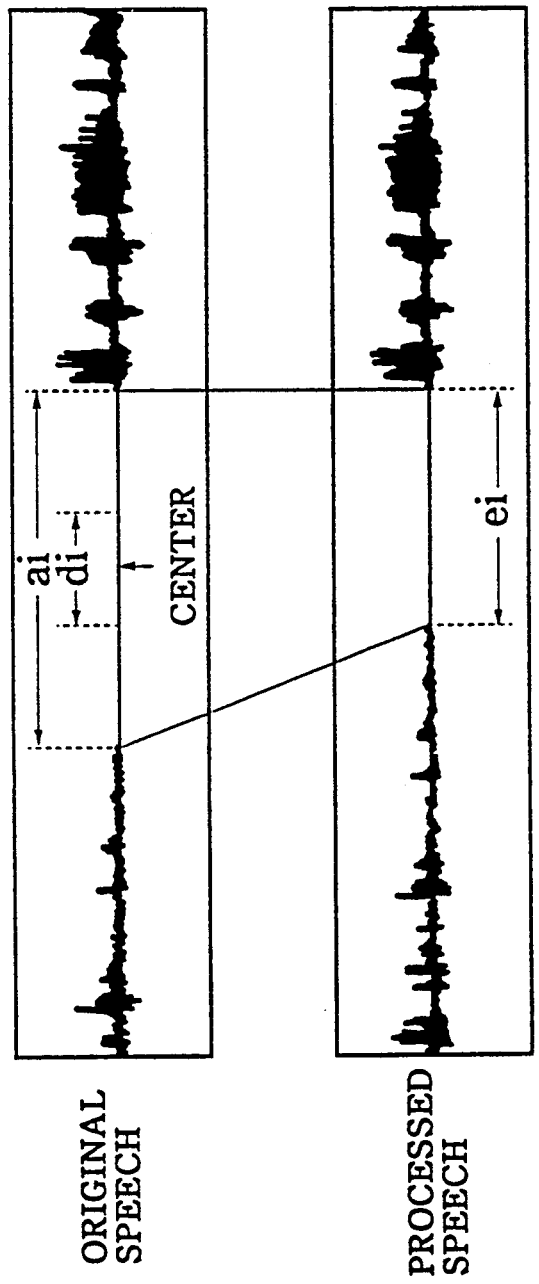
FIG. 8 is a diagram for explaining the contraction of silent sections of the speech by the apparatus of FIG. 4 in the procedure of FIG. 5.

Namely, the contracted silent section $e_i$ can be expressed as:

$$e_i = a_i - d_i \quad (2)$$

where $d_i$ is a portion to be deleted from the original silent section $a_i$. This portion $d_i$ is deleted from the original silent section $a_i$, as shown in FIG. 8, around a center of the original silent section $a_i$. The reason for not deleting this portion $d_i$ from the beginning of the original silent section $a_i$ is that there is a possibility for the original silent section $a_i$ to include a part of the unvoiced speech section $b_i$ by mistake at the step S2, so that it is preferable to provide a measure to avoid the accidental deletion of a part of the unvoiced speech section $b_i$.

Here, the edges of remaining parts of the silent section $a_i$ which are originally located next to the deleted portion $d_i$ are tapered smoothly by applying the smoothing process for few ms, so as to avoid the production of a clicking sound at the boundary of the original silent section $a_i$ and the deleted portion $d_i$. This smoothing is preferable especially because all the sounds other than the voiced and unvoiced speeches uttered by the human speaker are regarded as silent in this embodiment.

In this step S14, the length of the contracted silent section $e_i$ is set to be greater than the third threshold Th3 equal to the shortest silent section length with the naturalness on hearing. The length of the contracted silent section $e_i$ can be changed within this limit, but it is simpler to fix the length of the contracted silent section $e_i$ to the specific value close to the third threshold Th3, such as 862 ms for example. In the latter case, the length of the portion $d_i$ to be deleted is determined according to the length of the original silent section $a_i$.

At the step S15, the silent section stored in the input buffer 34 when the process proceeds from the step S13 to the step S15, or the contracted silent section $e_i$ obtained at the step S14, is stored in the processing buffer 35, and the input buffer 34 is cleared for the sake of the processing of the next section of the speech.

Then, at the step S16, unless the processing of the entire input speech entered at the speech input unit 31 is finished, the process returns to the step S1, so as to carry out the processing similar to that described above for the next section of the input speech.

Now, the result of the test conducted by using the apparatus for hearing assistance of the third embodiment described above will be discussed.

In this test, the input speech was a news document read in 136 seconds. In this case, the average speech speed was 9.6 mora/sec, so that the first, second and third thresholds Th1, Th2, and Th3 were set to be Th1=350 ms and Th2=Th3=1000 ms. With this setting, it was found that the naturalness and the easy comprehension on hearing the speech can be achieved by using the starting speech speed at the beginning of each speech part within a range of 1.0 to 1.3 times the original speech speed, and the ending speech speed at the end of each speech segment within a range of 0.9 to 1.0 times the original speech speed. As for the contraction of the silent sections, it was also found that the naturalness on hearing is not destroyed as long as the contracted silent section $e_i$ has the length equal to at least 862 ms.

Taking these results into consideration, it was possible to fit the processed speech perfectly into the original speech utterance period by using the starting speech speed equal to 1.2 times the original speech speed, the ending speech speed equal to 0.92 times the original speech speed, and the long silent sections contracted to 1200 ms, without loosing the naturalness on hearing, while achieving the better comprehension on hearing.

Thus, it was confirmed that, according to this third embodiment, it is possible to realize the effective hearing assistance without causing the extension of the speech utterance period.

As a consequence, the hearing assistance according to this third embodiment can be used effectively even in a case of TV broadcasting or tape recording.

Figure 5:
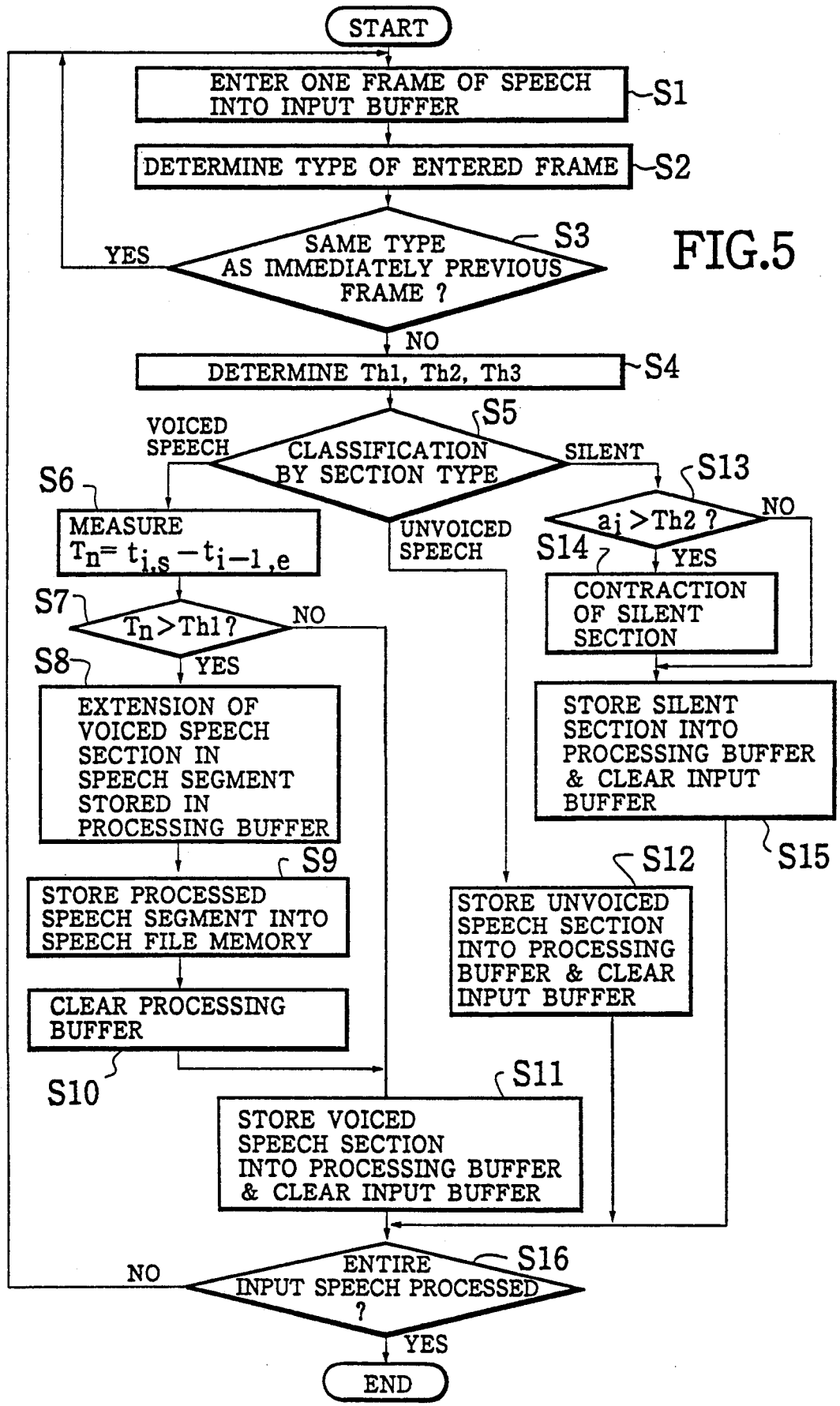
FIG. 5 is a flow chart of the operation of the apparatus for hearing assistance shown in FIG. 4.

It is to be noted that, at the step S8 of the flow chart shown in FIG. 5, it is preferable to maintain the pitch of the speech unchanged while the speech speed is gradually changed, and this can be achieved by utilizing the method used in the first and second embodiments described above.

It is also to be noted that the starting and ending extension rates $r_5$ and $r_\theta$ as well as the length of the contracted silent section $e_i$ can be made freely adjustable by a user by means of simple manual operations, such that the preference of each user can be reflected and the optimal setting to fit with the prescribed broadcasting period can be made easily.

It is also to be noted that the speech speed may be increased at the portions with the higher pitch and decreased at the portions with the lower pitch, by detecting the pitch (fundamental frequency) of the speech, instead of the extension of the voiced speech sections as described above.

Furthermore, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of hearing assistance, comprising the steps of:
   dividing input speech into voiced speech sections, unvoiced speech sections, and silent sections;
   subdividing each voiced speech section into pitch sub-sections according to pitch periods in said each voiced speech section;
   extending/contracting each pitch sub-section of each voiced speech section by a first extension/contraction rate to obtain extended/contracted voiced speech sections;
   extending/contracting each silent section by a second extension/contraction rate to obtain extended/contracted silent sections; and
   combining the extended/contracted voiced speech sections, the unvoiced speech sections, and the extended/contracted silent sections, in an identical order as in the input speech, to obtain output speech which is easier to hear for a listener with a handicapped hearing ability.

2. The method of claim 1, wherein at the step of extending/contracting each pitch sub-section and the step of extending/contracting each silent section, the first and second extension/contraction rates are adjusted according to the hearing ability of the listener.

3. The method of claim 1, wherein at the step of extending/contracting each pitch sub-section, each pitch sub-section is extended by repeating said each pitch sub-section for a number of times determined by the first extension/contraction rate.

4. An apparatus for hearing assistance, comprising:
   means for dividing input speech into voiced speech sections, unvoiced speech sections, and silent sections;
   means for subdividing each voiced speech section into pitch sub-sections according to pitch periods in each voiced speech section;
   means for extending/contracting each pitch sub-section of each voiced speech section by a first extension/contraction rate to obtain extended/contracted voiced speech sections;
   means for extending/contracting each silent section by a second extension/contraction rate to obtain extended/contracted silent sections; and
   means for combining the extended/contracted voiced speech sections, the unvoiced speech sections, and the extended/contracted silent sections, in an identical order as in the input speech, to obtain output speech which is easier to hear for a listener with a handicapped hearing ability.

5. The apparatus of claim 4, further comprising means for setting the first and second extension/contraction rates according to the hearing ability of the listener.

6. The apparatus of claim 4, wherein said means for extending/contracting each pitch sub-section extends each pitch sub-section by repeating said each pitch sub-section for a number of times determined by the first extension/contraction rate.

7. The apparatus of claim 4, wherein each one of said means for dividing the input speech, means for subdividing each voiced speech section, means for extending/contracting each pitch sub-section, means for extending/contracting each silent section, and means for combining is implemented in a form of a transputer module.

8. A method of hearing assistance, comprising the step of:
   dividing input speech into voiced speech sections, unvoiced speech sections, and silent sections;
   selecting punctuation silent sections for pauses due to punctuation between sentences among the silent sections;
   contracting each of the silent sections other than the punctuation silent sections into a contracted silent section;
   changing speech speed for each of the voiced speech sections to obtain adjusted voiced speech sections; and
   combining the adjusted voiced speech sections, the unvoiced speech sections, the punctuation silent sections, and the contracted silent sections, in an identical order as in the input speech, to obtain output speech which is easier to hear for a listener with a handicapped hearing ability.

9. The method of claim 8, wherein at the step of changing, the speech speed for each of the voiced speech sections is changed such that the speech speed is made slower than the speech speed of the input speech for the voiced speech sections with higher pitch, and the speech speed is made faster than the speech speed of the input speech for the voiced speech sections with lower pitch.

10. The method of claim 8, wherein at the step of changing, the speech speed for each of the voiced speech sections is changed such that the speech speed is made slower than the speech speed of the input speech at a beginning of each speech segment formed by a series of the voiced speech sections and the speech speed is made faster than the speech speed of the input speech at an end of said each speech segment.

11. The method of claim 10, wherein the speech speed is gradually changed from the beginning to the end of said each speech segment according to a continuous function.

12. The method of claim 10, wherein the speech speed is gradually changed according to a change of a pitch in the input speech.

13. An apparatus of hearing assistance, comprising the step of:
   means for dividing the input speech into voiced speech sections, unvoiced speech sections, and silent sections;
   means for selecting punctuation silent sections for pauses due to punctuation between sentences among the silent sections;
   means for contracting each of the silent sections other than the punctuation silent sections into a contracted silent section;
   means for changing speech speed for each of the voiced speech sections to obtain adjusted voiced speech sections; and
   means for combining the adjusted voiced speech sections, the unvoiced speech sections, the punctuation silent sections, and the contracted silent sections, in an identical order as in the input speech to obtain output speech which is easier to hear for a listener with a handicapped hearing ability.

14. The apparatus of claim 13, wherein said means for changing changes the speech speed for each of the voiced speech sections such that the speech speed is made slower than the speech speed of the input speech for the voiced speech sections with higher pitch, and the speech speed is made faster than the speech speed of the input speech for the voiced speech sections with lower pitch.

15. The apparatus of claim 13, wherein said means for changing changes the speech speed for each of the voiced speech sections such that the speech speed is made slower than the speech speed of the input speech at a beginning of each speech segment formed by a series of the voiced speech sections and the speech speed is made faster than the speech speed of the input speech at an end of said each speech segment.

16. The apparatus of claim 15, wherein the speech speed is gradually changed from the beginning to the end of said each speech segment according to a continuous function.

17. The method of claim 15, wherein the speech speed is gradually changed according to a change of a pitch in the input speech.

* * * * *